B. M. HOTCHKISS & G. M. ALLERTON.
Improvement in Vulcanizing Apparatus.

No. 115,207. Patented May 23, 1871.

No. 115,207

UNITED STATES PATENT OFFICE.

BURRITT M. HOTCHKISS, OF NAUGATUCK, CONNECTICUT, AND GEORGE M. ALLERTON, OF NEW YORK, N. Y.

IMPROVEMENT IN VULCANIZING APPARATUS.

Specification forming part of Letters Patent No. 115,207, dated May 23, 1871.

*To all whom it may concern:*

Be it known that we, BURRITT M. HOTCHKISS, of Naugatuck, in the State of Connecticut, and GEORGE M. ALLERTON, of the city and State of New York, have invented an Improvement in Vulcanizing Apparatus; and the following is declared to be a correct description of the same.

In curing or vulcanizing articles of India rubber, it has been usual to put the material into molds and clamp them together, and introduce the said molds into a space that is sufficiently heated to effect the vulcanization. In these cases the separate clamps for each mold occupy considerable space, and require time for applying and removal; besides this, the pressure is not yielding or uniform. Other presses have been made wherein a screw and follower are used to press upon all the molds that may be introduced in the vulcanizing space, and these screws have either acted against the case of the apparatus or against head-blocks held together by tie-rods outside the case. The object of our present improvement is to furnish a ready and reliable means for applying a constant pressure to the molds and articles in a vulcanizing apparatus, which pressure will be self-acting to apply the proper force, but at the same time allow for expansion or contraction without change of pressure or the care of the attendant.

We make use of a cylinder and ram or piston connected with the vulcanizing apparatus, and connect the same, by a pipe or pipes, with a pump for compressing or forcing a fluid or liquid, so that the cylinder and ram or piston will apply to the molds the necessary pressure, and the pump may be continuously operative, and provided with an escape or pressure safety-valve and the necessary cocks or valves, whereby the attendant simply has to place the molds in the vulcanizing-chamber, to which the proper steam or other heat is applied, and then allow the said pressure to act to keep the molds together, and that pressure will be uniform and self-acting, because if the molds expand the piston or ram yields, and if the material lessens in bulk the pressure will be maintained by the movement of the piston or ram.

Figure 1:
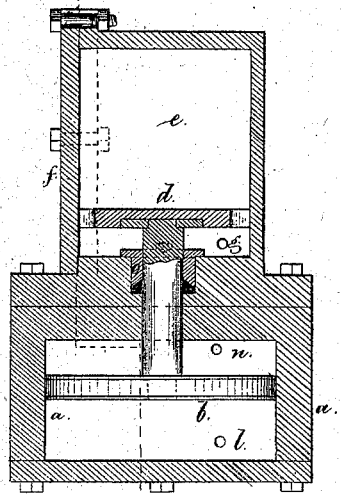
Figure 2:
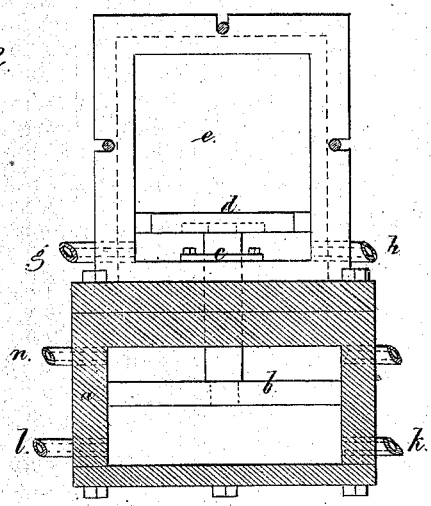

In the drawing, Figure 1 is a vertical section, and Fig. 2 is an elevation, partially in section, of our said vulcanizing apparatus.

The cylinder $a$ contains a piston or ram. We have shown the piston $b$ passing through a packing, $c$, and connected with the follower or platen $d$ that is within the vulcanizing chamber or space $e$. We have shown such chamber as made with a movable cover, $f$, and inlet steam-pipe $g$ and outlet-pipe $h$; but this vulcanizing-chamber may be made in any convenient manner, and adapted to work to be performed, as the heat may be steam or other heat, and the same may be admitted into the chamber containing the molds; or a surrounding double case or heater may be employed in vulcanizing. The pipe $k$ is connected with a pump or reservoir, from which air, water, or other liquid or fluid is admitted after the molds have been placed in the vulcanizing-chamber $e$ to apply the proper pressure; and we remark that the size of the piston or ram $b$ or the pressure of the fluid is to be so proportioned as to apply the proper force to the molds. The escape-pipe $l$ allows the pressure to be removed when the pipe $k$ is closed, and the opening of the molds may be facilitated, or access be given for their removal by admitting pressure through the pipe $n$ on the opposite side of the piston $b$.

The necessary cocks or valves are to be provided, and we remark that the yielding force acting upon the molds as aforesaid may be resisted either by the case of the vulcanizing-chamber or by a head-block especially provided; and the piston or ram may operate from above, below, or at either side of the vulcanizing case; and where pressure is required in more than one direction a second piston or ram may be employed.

A number of vulcanizing-chambers may be connected with pipes and valves or cocks with one pump operated by power, so as to entirely relieve the attendant of the trouble of operating screw or other clamps.

The pressure may be obtained from a column of water or other liquid, or a reservoir containing fluid or liquid under pressure may be employed as the actuating power.

We are aware that an apparatus has been used in which the pressure of steam generated in the vulcanizing apparatus has been employed to press the molds together, but in this case the molds could not be pressed together until there was sufficient heat to produce the necessary pressure.

In our apparatus the pressure is exerted by a fluid independent of the vulcanizing heat; hence the molds can be adjusted and the pressure applied before the material is heated, and the operation rendered very perfect.

We claim as our invention—

A cylinder and piston outside the vulcanizing-chamber, and pipes connecting with a supply of fluid or liquid under pressure, substantially as specified, whereby the power exerted to hold the molds together with a yielding force is independent of the vulcanizing operation, as set forth.

Signed by us this 27th day of March, A. D. 1871.

BURRITT M. HOTCHKISS.
GEO. M. ALLERTON.

Witnesses:
CHAS. H. SMITH,
GEO. T. PINCKNEY.